April 12, 1960   G. E. VALENTINE ET AL   2,932,166
STOKER DRIVE MECHANISM
Filed Sept. 1, 1955   4 Sheets-Sheet 3
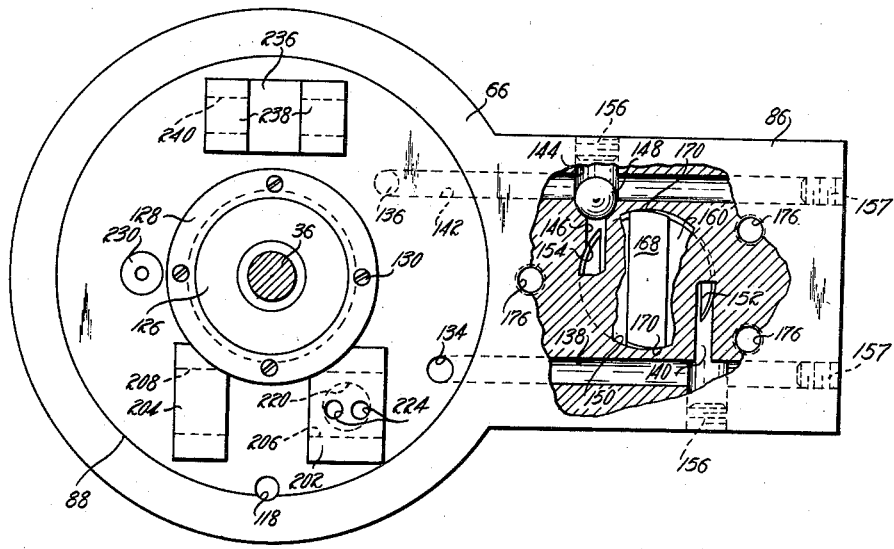
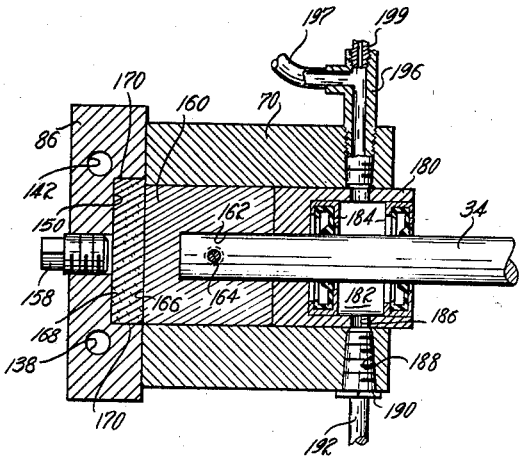
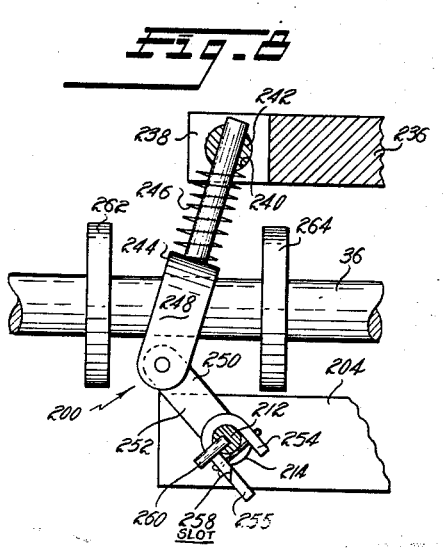
INVENTORS
GEORGE G. VALENTINE
JOSEPH H. EUBANKS
BY
ATTORNEYS April 12, 1960　　G. E. VALENTINE ET AL　　2,932,166
STOKER DRIVE MECHANISM
Filed Sept. 1, 1955　　　　　　　　　　　　4 Sheets-Sheet 4
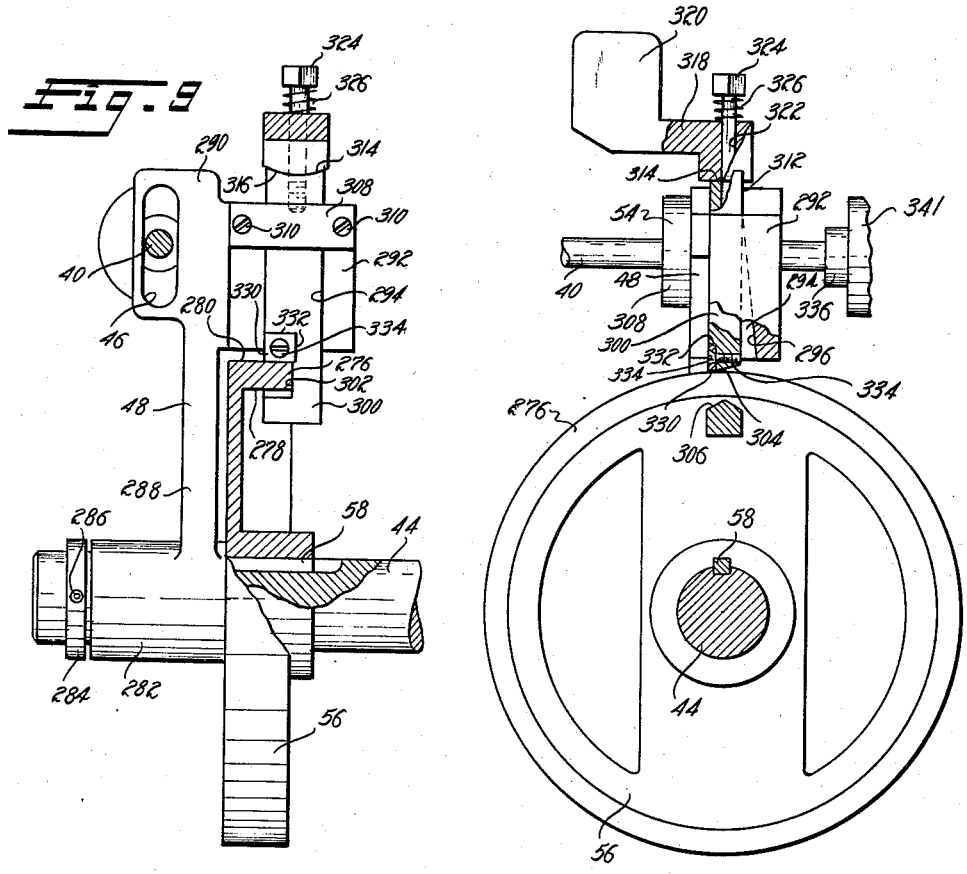
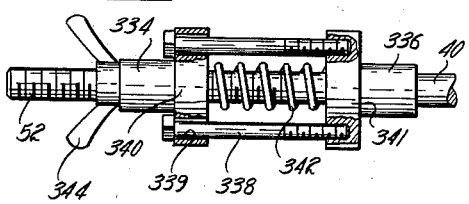
INVENTORS
GEORGE G. VALENTINE
JOSEPH. H. EUBANKS
BY
ATTORNEYS

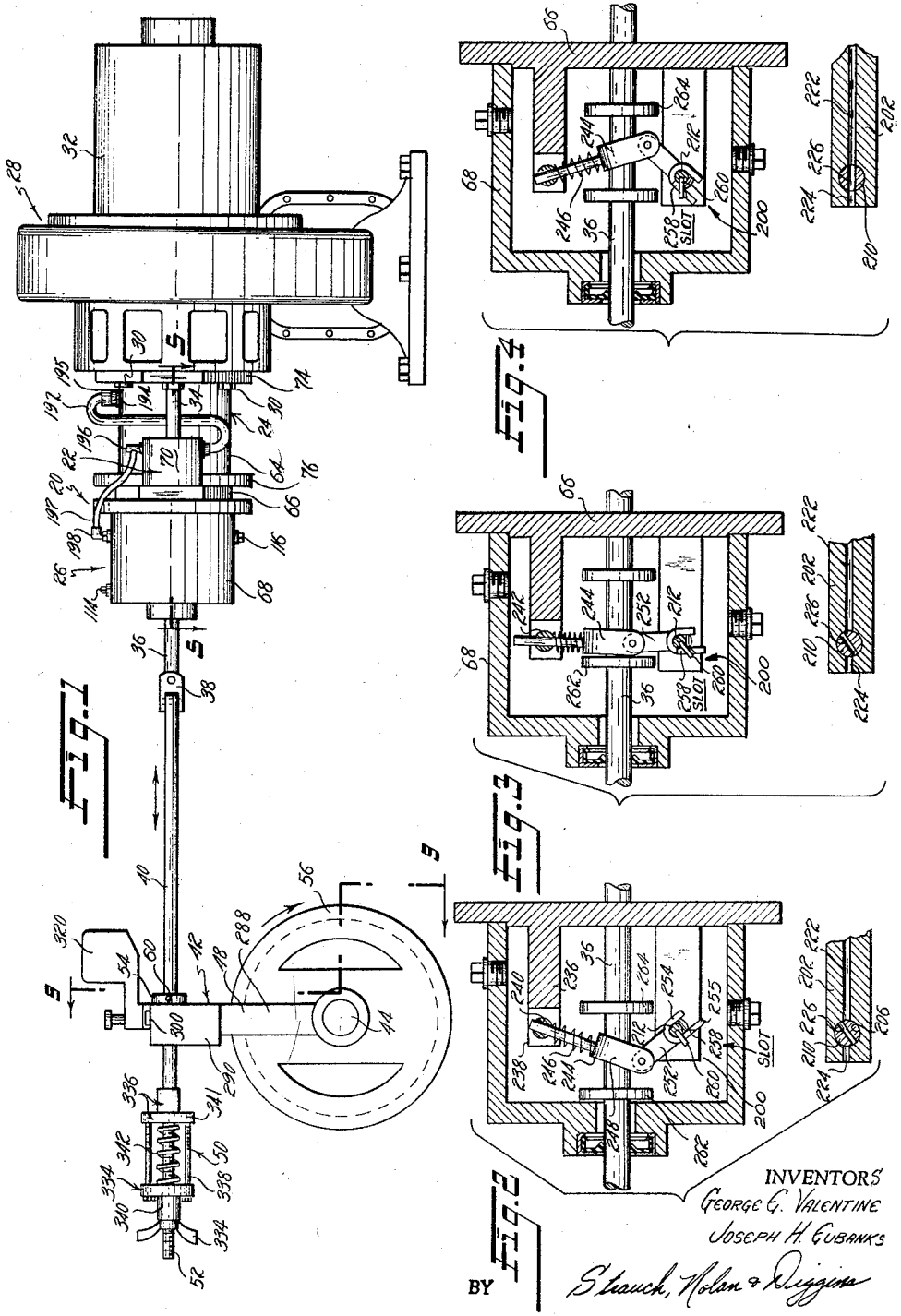

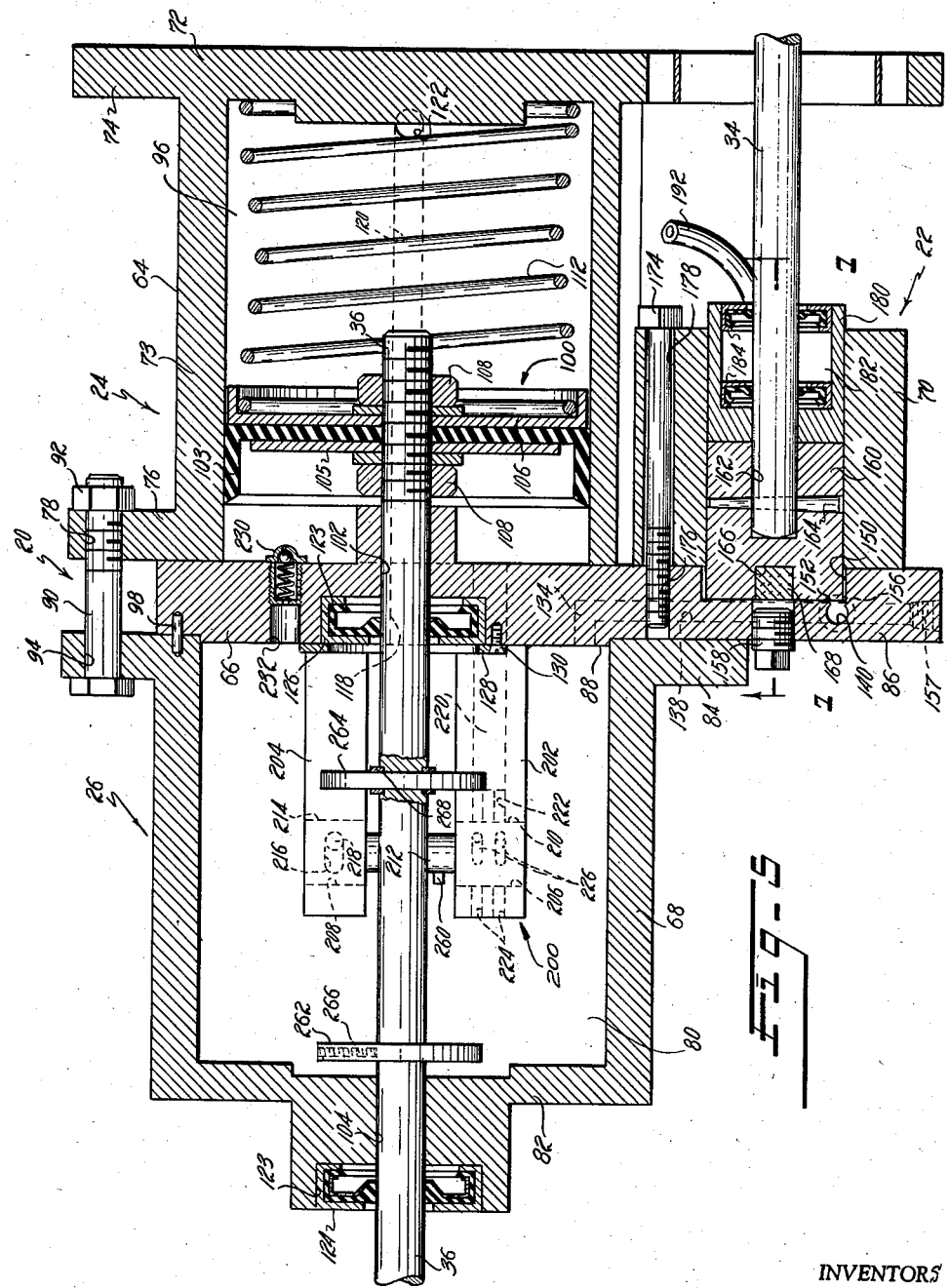

United States Patent Office 2,932,166
Patented Apr. 12, 1960

2,932,166

STOKER DRIVE MECHANISM

George E. Valentine and Joseph H. Eubanks, Schuylkill Haven, Pa., assignors to V. & E. Products, Inc., Schuylkill Haven, Pa., a corporation of Pennsylvania Application September 1, 1955, Serial No. 532,078

11 Claims. (Cl. 60—52)

This invention relates to a power actuated intermittent stoker drive. More particularly this invention relates to a hydraulic speed reducer driven by a relatively high-speed motor and coupled to a low speed reciprocatory unidirectional intermittent stoker worm drive mechanism.

Intermittent unidirectional clutch driven stoker feed wheels are known, one such mechanism being disclosed in United States Patent 2,142,815 to W. W. Getz which illustrates a belt driven wheel having an eccentric roller intermittently actuating a gripping dog one-way clutch to provide intermittent unidirectional increments of stoker worm shaft rotation. Other previously known types of stoker drives utilize speed reduction gearing between an electric motor and the stoker feed mechanism, to operate the feed mechanism either intermittently or at a very slow continuous rate.

Operation of such previously known stoker feed devices is generally satisfactory but they have several inherent objectionable features. Normal operation of such devices is noisy and all tend to become noisier after a continued period of operation. Furthermore, mechanical devices requiring a plurality of relatively moving parts such as belts, pulleys, eccentrics and gears are subject to unreliable performance or breakdown even when continuously serviced.

The present invention is quiet in operation even after continued use and incorporates a hydraulic speed reducing mechanism, operating continuously in its own fluid, which is less susceptible to breakdowns, even when service is neglected, and is therefore more dependable over longer periods of operation. The hydraulic speed reduction mechanism is a rugged, powerful and compact unit capable of large reductions in speed.

The unitary hydraulic speed reducing mechanism may for convenience, be driven by the electric motor used to drive the furnace blower fan assembly and converts high speed rotary movement of the motor shaft to a low speed reciprocatory movement. The unitary hydraulic device incorporates an automatic reversing control valve to automatically accomplish a periodic reversal of a servo-motor operating a reciprocating shaft. The reciprocating shaft connects, through an improved unidirectional dog type clutch, to a drive wheel fixed to a rotatable shaft element of a stoker feed mechanism. The hydraulic unit includes a positive displacement pump that is easily adjusted to vary the output capacity, and the interconnection between the reciprocatory shaft and the unidirectional wedge clutch is further adjustable to vary the amplitude of each increment of intermittent stoker rotation. To provide a longer life for the gripping clutch dog and decrease replacement costs for clutch parts, a four way gripping jaw insert has been devised.

Accordingly a primary object of this invention resides in the provision of an improved dependable stoker feed mechanism.

A further object resides in the provision of a stoker feed mechanism having a hydraulic speed reducer converting high-speed rotary movement to low-speed reciprocatory movement, in combination with a unidirectional clutch mechanism to convert the reciprocatory movement back to incremental rotary movement of a stoker feed worm.

A still further object resides in the provision of a novel unitary hydraulic speed reducer for converting rotary movement to reciprocatory movement.

Another object resides in the provision of a novel snap-action reversing valve assembly to provide automatic reciprocation of a servo-motor assembly.

Still another object resides in a novel reciprocatory servo-motor and automatic motor control system.

Further objects and advantages of the invention will be apparent from the foregoing description and the appended claims taken in conjunction with the accompanying drawings, wherein:

Figure 1 is a side elevation view illustrating an example of the hydraulic speed reducer unit and stoker feed mechanism as adapted for use in a worm type furnace stoker:

Figures 2, 3 and 4 are diagrammatic sectional views illustrating successive operative positions of the snap-action control valve in the hydraulic speed reducer unit;

Figure 5 is an enlarged horizontal section view taken on lines 5—5 of Figure 1 illustrating the structural cooperation of the elements in the hydraulic speed reducer unit;

Figure 6 is a partially broken enlarged vertical left side view of Figure 5 with the valve and valve cover removed, illustrating details of the integral valve plate and pump structure;

Figure 7 is an enlarged vertical sectional view taken on lines 7—7 of Figure 5 illustrating further details of the pump unit;

Figure 8 is an enlarged detail view of the snap-action valve assembly;

Figure 9 is an enlarged vertical section view taken on line 9—9 of Figure 1 illustrating details of the unidirectional feed mechanism;

Figure 10 is a left side elevation view of the feed mechanism shown in Figure 9 with parts broken away to show details of the unidirectional drive structure; and Figure 11 is an enlarged sectional view of the adjustable abutment cage fastened to the end of the reciprocatory feed shaft.

General

The application of the speed reducer and feed mechanism to a furnace stoker is illustrated in Figure 1. The speed reducing unit 20 with a pump 22, a reciprocating servo-motor 24 and control structure 26, as illustrated, is mounted on a furnace blower unit 28 by machine screws 30. Blower unit 28, per se forms no part of this invention and merely illustrates one convenient manner of deriving power for the speed reducing unit from equipment available in the majority of furnace installations. The electric motor 32 of the blower unit 28 has its drive shaft universally or flexibly coupled (not shown) to the pump impeller shaft 34. The motor may be a conventional 1750 r.p.m. motor ordinarily having a H.P. rating of ⅙, ¼ or ⅓.

Rotary movement of pump 22 is converted through the speed reducer 20 to reciprocatory movement of the piston rod 36 which extends through the control structure 26 and has its projecting end fastened to a universal coupling 38. The speed reduction from rotation of impeller shaft 34 to reciprocation of piston rod 36 is desirably a ratio of 1500:1. By increasing or decreasing the output capacity of pump 22, in a manner to be hereinafter described, the ratio of speed reduction may be varied.

Connected to the other side of universal fitting 38, a feed shaft 40 extends to and cooperatively engages a unidirectional clutching mechanism 42 carried by the stoker sprocket shaft 44. Feed shaft 40 passes through a slotted opening 46 (Figure 9) in the upper end of clutch fitting 48 and carries an adjustable resilient abutment cage 50 on its threaded end 52. The unidirectional clutch mechanism 42 will be more fully described hereinafter, but for purposes of general explanation reciprocation of feed shaft 40 (Figure 1) to the right will cause the abutment cage 50 to engage clutch fitting 48 and move it a short increment in a clockwise direction. Unidirectional clutch action will grip and rotate a wheel 56, drivingly connected to the sprocket shaft 44 by a spline 58, the same increment of rotation imparted to the clutch fitting 48. Reverse reciprocation of piston rod 36 moves the feed shaft 40 and abutment cage 50 to the left, and collar 54, fastened to shaft 40 by set screw 60, will abut the clutch fitting 48 and force it counterclockwise. The collar 54 is so positioned on shaft 40 that it does not force the clutch fitting over center when the feed shaft 40 is at the left hand end of its stroke. Because of the unidirectional nature of clutch mechanism 42 the counterclockwise movement of fitting 48 by collar 54 will not cause a counterclockwise rotation of wheel 56 and stoker sprocket shaft 44.

Hydraulic speed reducing unit

Speed reducer unit 20 is assembled in four sections, a piston cylinder 64, a valve plate 66, a valve and reservoir housing 68 and the pump housing 70, Figure 5 showing the assembled relationship of these parts. The piston cylinder end wall 72 extends radially beyond the cylinder wall 73 to provide a mounting flange 74 whereby the speed reducer unit 20 can be rigidly fastened to any suitable support structure as by screws 30, illustrated in Figure 1.

The opposite end of piston cylinder 64 includes an integral radial flange 76, discontinuous at one side to enable the pump cylinder 70 to be disposed closely adjacent the piston cylinder wall. A plurality of circumferentially spaced holes 78 are formed in flange 76. The valve and reservoir housing 68 includes the hollow chamber 80 and one end is closed by an integral end wall 82. The other end of housing 68 has an integral radial flange 84. The valve plate 66 has a main circular section with an integral side extension 86 used as a support for and part of the pump 22, as will be explained. A raised annular portion 88 on one side face of valve plate 66 is piloted within the walls of the valve and reservoir housing 68 when the valve plate 66 is assembled against the flanged end 84 of the valve housing, thereby constituting a closure for the recess 80. Valve housing 68 and juxtaposed valve plate 66 are clamped against the open end of piston cylinder 64 by bolts 90 and nuts 92 which pass through openings 94 provided in the valve housing flange 84 and the aforementioned openings 78 in the piston cylinder flange 76 resulting in two closed chambers 96 and 80 partitioned by the valve plate 66. To properly locate the valve plate 66 angularly relative to the piston cylinder 64 and valve housing 68, one or more locating pins 98 may be utilized.

Disposed within the chamber 96 of piston cylinder 64 is a piston assembly 100 fastened to the piston rod 36, which projects through coaxial bores 102 and 104 in the valve plate 66 and in the end wall 82 of valve housing 68 respectively.

Piston assembly 100 may be of any conventional structure but, for purposes of disclosure, includes a cup-shaped rubber or leather piston element 103 backed up by metal discs 105 and 106 and clamped and locked to the threaded end of piston rod 36 by nuts 108. The right hand plate member 106 has an axial peripheral flange 110 and constitutes a recess seat to receive one end of a coil spring 112. The other end of coil spring 112 abuts the inside of the piston cylinder end wall 72. When fluid under pressure is introduced into chamber 96 from the valve plate 66, piston 100 will move to the right under hydraulic pressure. Such piston movement compresses the coil spring 112. Subsequent release of the fluid under pressure from the left side of piston 100 will enable the stored spring force of coil spring 112 to move the piston to the left.

The chamber 80 provided within the valve housing 68 serves as an oil reservoir filled through a hole in the top of housing 68, the hole being normally closed by a plug 114. The reservoir can be drained through a similar hole located in the bottom of housing 68 and normally closed by plug 116. Fluid communication is provided between the oil reservoir chamber 80 and the right hand end of piston chamber 96 for equalizing pressures caused by piston movement and consists of a passage 118 in valve plate 66, and a coextensive longitudinal passage 120 intersecting with a short radial passage 122. Passages 120 and 122 are both provided in the cylindrical wall 73 of piston cylinder 64. This passage is disposed along the bottom of the assembled units and besides an equalizing function, also provides means for any fluid that may leak past the piston assembly 100 to effectively remain in the reservoir system. As will be understood, suitable gaskets or sealing means may be incorporated at the joining surfaces of the piston cylinder 64, valve plate 66 and valve housing 68.

Counterbores 123, provided around the piston rod bores 102 and 104 receive oil seal rings 124 and 126. Seal ring 124 may be press fit within counterbore 123 but it is preferable to press fit and additionally positively retain seal ring 126 within its bore by means such as a clamping ring 128 fastened to the left hand side of valve plate 66 by screws 130.

Integrally formed in valve plate 66 are an inlet passage 134 and an outlet passage 136 (Figure 6) which interconnect with the intake and discharge passages of the pump, as will be later described. Inlet passage 134 opens on the side of valve plate 66 facing the reservoir chamber 80 and is placed near the bottom of the chamber to assure its being below the fluid level, while outlet passage 136 opens on the side of valve plate 66 facing the pressure side of piston 100. As illustrated in Figure 6, inlet passage 134 intersects with a lateral passage 138, passing through the lower portion of the valve plate side extension 86, which in turn intersects with a vertical passage 140 extending to a substantially mid position of extension 86. The outlet passage 136 intersects with a lateral passage 142, above the passage 138, which in turn intersects with a vertical bore 144 terminating in vertical passage 146. A ball 148 is disposed within the bore 144 and constitutes an outlet check valve to prevent reverse flow from longitudinal passage 142 into passage 146. An integral impeller chamber 150 is provided by an annular recess on the piston side face of the valve plate extension 86 and intersects, at diametral positions, with the vertical intake and discharge passage 140 and 146. The intersections of the pump impeller chamber with passages 140 and 146 constitute the pump intake 152 and discharge 154. Various external openings of the different bores and passages occasioned during production, are tapped and closed by plugs 156, 157 and 158.

A vane type cylindrical pump impeller 160 with a diameter slightly smaller than the diameter of impeller chamber 150 is disposed with one end resting within and its axis eccentric to the impeller chamber 150. The impeller drive shaft 34 fits in a concentric blind bore 162 in the other end of the impeller 160 and is keyed to the impeller by a tapered pin 164. The pumping end of impeller 160, that end disposed in the impeller chamber 150, includes a diametral cross slot 166 containing a pumping vane 168 whose diametral end surfaces 170 are disposed in a substantially abutting relationship with the cylindrical wall of impeller chamber 150 to provide a close running fit. As is conventional and well understood to those skilled in the art, the eccentricity of impeller 160 relative to the impeller chamber 150 will determine the pumping capacity of the disclosed vane type pump. Impeller 160 is rotatably disposed within pump housing 70 and to obtain the eccentric adjustment of the impeller, housing 70 is fastened to the valve plate extension 86 by a plurality of bolts 174 passing through holes 178 in the pump housing and threaded tapped openings 176 within the valve plate extension 86. The holes 178 in pump housing 70, through which bolts 174 pass, have sufficient clearance around the bolt shanks to enable the pump housing together with impeller 160 to be shifted relative to the impeller chamber 150 before the bolts are tightened. The adjustable eccentricity enables a simple but positive control of pump output capacity.

Pump impeller 160 is maintained in axial position in the pump housing 70 by a seal bushing 180, press fit in the end of housing 70 around the impeller shaft 34. The seal bushing 180 is counterbored to form a small chamber 182 surrounding the impeller shaft 34. Two oil seal rings 184 are press fit into the bushing 180 in spaced relation to enclose chamber 182 and form a small reservoir to trap any fluid that may tend to leak past the impeller 160 and along shaft 34 to the interior of bushing 180. As shown in Figure 7, an aperture 186 is provided at the lower side of bushing 180, and, in assembly, is coextensive with a tapped lower opening 188 in the pump housing 70. A drain fitting 190 is fastened in opening 188 and connects to a tubular conduit 192 that communicates with a similar fitting 194 in the top wall of piston cylinder 64 adjacent the right hand mounting flange 74. This conduit between the small bushing reservoir 182 and the right hand side of piston chamber 96 constitutes a simple siphon arrangement whereby upon a reciprocation of piston assembly 100 toward the left, a low pressure is momentarily created in the right hand part of the piston chamber to siphon fluid that has leaked into the bushing reservoir 182, up and into the right hand side of the piston chamber 96. From this point the oil is in essence back in the oil reservoir because of the equalizing passages 118, 120 and 122. Fitting 194 preferably includes or has connected in fluid communication between it and conduit 192 a check valve 195 that is arranged to prevent any flow of oil from the piston cylinder 64 to the bushing reservoir 182, but permit oil to pass from reservoir 182 to the piston cylinder.

A T-fitting 196 is provided in the top of pump housing 70 and is connected through conduit 197 to the top of valve housing 68 by an L-fitting 198, to provide fluid communication between reservoir 182 and valve housing 68. An orifice fitting 199 is threaded in the top of T-fitting 196 to provide a breather for both the reservoir and valve housing. Conduit 197 enables any overflow of oil from valve housing 68 to pass into the pump housing reservoir and be returned through the siphon conduit 192 to the piston cylinder 64.

To control accumulation and release of fluid under pressure on the pressure side of piston assembly 100, a snap action valve assembly 200 is arranged on the left hand face of valve plate 66 within the reservoir chamber of the valve housing 68. The snap action valve assembly 200 is automatically actuated by reciprocation of the piston rod 36 in a manner to be described.

The actual valve structure includes two posts 202 and 204 projecting laterally from the left hand side of the valve plate 66. The end of each post 202 and 204 includes respective lateral bores 206 and 208 coaxially arranged. A valve plug 210 is rotatably disposed in bore 206 of post 202 and has an integral stem 212 with a cylindrical end portion 214 journalled in bore 208 of post 204. A blind hole is drilled in the journal end 214 perpendicular to the stem axis and contains a spring loaded ball 218 which bears against the side wall of bore 208 and provides a slight amount of friction to prevent inadvertent rotation of the valve plug 210 during preliminary movement of the valve trip mechanism.

A relatively large passage 220 is provided through the valve plate 66 and extending into post 202, terminating short of the valve plug bore 206. Two smaller diameter passages 222 continue from the termination of passage 220 and intersect the bore 206. Coextensive with the small passages 222 and extending from the opposite side of bore 206 to the end face of post 202 are two additional passages 224. Two through ports 226 are provided in valve plug 210 and upon rotation of plug 210, will be aligned with and provide through communication from passage 222 to passages 224, and into the reservoir chamber 80. Rotation of valve plug 210 to place the plug ports 226 out of alignment with the valve post passages will effectively close communication from the pressure side of piston chamber 96 into the oil reservoir chamber 80. Thus when the valve assembly 200 closes the passages 222, fluid under pressure delivered by pump 22 through the discharge passage 142 and outlet 136 will accumulate behind and force the piston 100 to the right in chamber 96 and compress spring 112. Movement of the piston assembly 100 to the right will be positively limited by abutment of the end of shaft 36 against the end wall 72. As a safety feature, in the event valve assembly 200 is not automatically actuated by piston movement to the right, a high pressure relief valve 230 is fixed in a tapped passage 232 through the valve plate 66. Rotation of the valve plug 210 to align its ports 226 with passages 222 and 225 will permit the fluid under pressure behind the piston assembly 100 to escape into the reservoir and enable the biasing force of compressed spring 112 to move the piston assembly 100 to its left hand limiting position. With the passages to the reservoir open, the fluid being discharged by the continuously rotating pump 22 will pass through such valve controlled passages and cannot accumulate to exert pressure against the piston assembly. When the piston reaches a left hand position, valve plug 210 will be rotated to block the passages 222, and fluid under pressure can again build up behind piston assembly 100 and move the piston and piston rod 36 to a right hand position.

Automatic control of valve plug rotation is accomplished by the linkage illustrated in Figures 2, 3, 4 and 8. A third laterally projected post 236 with a bifurcated end 238 is integrally fixed on the same face of valve plate 66 as the two posts 202 and 204. The bifurcated end 238 is laterally bored at 240 to receive a wrist pin 242 whose axis lies in a plane substantially transverse of the piston rod and including the axis of valve stem 212. A central transverse opening provided in the wrist pin 242 receives the shank end of a yoke shaped link 244 which is biased away from wrist pin 242 by a coil spring 246. The yoke arms 248 of link 244 straddle the piston rod 36 and pivotally interconnect with the shank end 250 of a lower yoke shaped link 252. Yoke arms 254 and 255 of the lower yoke element 252 are disposed between the two valve posts 202 and 204 and straddle the valve stem 212 between plug 210 and journal portion 214, thereby maintaining the axial position of valve plug 210 relative to its bore 216. One side of the lowermost yoke arm 255 is cut away to form a slot 258 that embraces and coacts with a projecting pin 260 press fit laterally in the valve stem 212. Coaction between the slot 258 and valve stem pin 260 provides a lost motion valve stem operating connection enabling a resultant snap action valve movement in both directions.

Operation of the valve assembly 200 occurs automatically through coaction between the valve assembly and two trip collars 262 and 264 fixed on piston rod 36 disposed on either side of the two connected yoke shaped links 244 and 252. Trip collars 262 and 264 may be fixed relative to piston rod 36 by set screws 266, spring clips 268 coacting with grooves in the piston rod 36, or by welding (not shown).

Figures 2, 3 and 4, indicate progressive movement of the piston rod to the right, i.e., movement of the piston under fluid pressure from the pump 22. In Figure 2, the yoke assemblies are pivoted to their left hand position, limited by abutment of yoke 244 against piston rod 36, and are maintained in that position by the force of spring 246. In this left hand position the upper edge of slot 258 abuts the pin 260 and maintains the valve plug 210 rotated so its through port 226 is out of alignment with the relief passage 222, closing the passage and permitting fluid under pressure from the pump 22 to accumulate behind the piston assembly 100. As the piston moves to the right (Figure 3) the trip collar 262 engages and moves the yokes 244 and 252 causing wrist pin 242 to pivot but, because of the lost motion connection with the valve stem, does not rotate the valve stem 212. This yoke movement up to a dead center alignment of wrist pin 242, yoke link pivot and the valve stem 212 depends on the movement of the piston rod 36. During this initial travel of yoke links 244 and 252, the elongated slot 258 has no effect upon the valve stem pin 260 and the valve, being maintained in position by the frictional force of the spring loaded ball 218 in its journal end, will remain in a closed position as indicated. When the valve yoke links reach a dead center position the lower edge of the lower yoke slot 258 is substantially in engagement with the valve stem pin 260. As indicated in Figure 4, when the trip collar 262 moves the yoke assembly past a dead center position, the force of compressed yoke spring 246 will snap the yoke assembly to its right hand limit position, also determined by abutment of the upper yoke 244 against the piston rod 36. In this position, Figure 4, the lower edge of the slot 258 in the arm of lower yoke link 252 engages and moves the pin 260 to rotate the valve stem 212, placing the plug ports 226 in alignment with relief passages 222 to relieve the fluid under pressure behind piston assembly 100.

With the valve assembly in the right hand position the piston assembly 100 under the force of coil spring 112 in the right hand end of the piston chamber 96 begins to move to the left. Movement of the piston rod 36 to the left causes the right hand trip collar 264 to engage the yoke links 244 and 252 and automatic valve actuation results in the opposite fashion to that just described. This alternate operation is automatically repeated as long as the pump 22 is operating.

*Stoker feed mechanism*

Disclosed in combination with the hydraulic speed reducer in Figure 1 and in more specific detail in the enlarged Figures 9 and 10, a specific stoker feed structure comprising a feed sprocket (not shown) is fixed to rotate with sprocket shaft 44. The speed reducer 20, its reciprocating piston rod 36 and connected feed shaft 40 are so disposed that the feed shaft 40 will be substantially transverse to the axis of sprocket shaft 44. As previously described, a sprocket shaft feed wheel 56 is fixed to the shaft 44 by spline 58. The rim 276 of wheel 56 is formed as an axially directed annular flange with cylindrical inner and outer surfaces 278 and 280. Sprocket shaft 44 projects beyond the wheel 56 and forms a journal for the hub member 282 of the previously mentioned clutch fitting 48 which is axially retained on the end of shaft 44 by means of a collar 284 and set screw 286.

Fitting 48 includes an arm 288 vertically disposed at the side face of wheel 56. At the top of arm 288, a relatively heavy integral side boss 290 includes the previously mentioned slot 46 which is directed transverse to the journal axis of hub 282. On the opposite side of the top of vertical arm 288 a second boss 292 projects over the rim 278 of wheel 56. The side face of boss 292 which is disposed toward the hydraulic speed reducer 20 has a vertical channel 294 formed from top to bottom with the back wall 296 of the channel inclined down and away from a plane passing through the vertical arm 288 and including the axis of the hub 282.

A unidirectional clutch dog 300 consisting of a bar, with a horizontal recess 302 near its lower end forming upper and lower gripping jaws 304 and 306 respectively, is placed in channel 294 with the recess 302 disposed over the wheel flange 276 so the upper jaw 304 rests on the outer cylindrical surface 280 of flange 276. Dog 300 fits in the vertical channel 294 with a free close fit and is prevented from being displaced out of the channel by the plate 308 fastened to the front face of boss 202 by the screws 310. In Figure 10, movement of the clutch fitting 48 toward the left exerts a force through the upper edge 312 of channel 294 abutting the upper end of clutch dog 300 and, as the upper jaw 304 of dog 300 rests on the outer cylindrical surface of wheel flange 276 with a slight frictional force, the dog 300 will cant forward as permitted by the inclined rear face 296 of channel 294 and a gripping action occurs between the jaws 304, 306 on wheel flange 276. Movement of the clutch fitting 48 toward the right (Figure 10) will cause the dog 300 to straighten and release its grip on flange 276 while it is being carried to the right or clockwise by the fitting 48. Note, when moving toward the right the dog will pivot on the wheel flange until it becomes aligned radially with the pivot axis of fitting 48 and will be maintained in such position by coacting between the top edge 312 of channel 294 and the rear face of plate 308. In this position, sufficient clearance exists between the dog jaws 304 and 306 to permit free relative movement between the dog 300 and wheel 56. Thus, an incremental rotation of fitting 48 to the left (Figure 10) imparts an equivalent incremental rotation to wheel 56 and sprocket shaft 44, and incremental movement of fitting 48 back to its rest position will release the dog 300 and move it back a specific increment about the circumference of wheel 56 to a new gripping position, and such periodic oscillation of the fitting 48 results in unidirectional The upper end 314 of dog 300 has a concave curve forming half of a clutch dog control detent. The other half of the detent is the convex end 316 on the horizontal arm 318 of a weighted member 320. A vertically disposed hole 322 is provided through the end 316 of weighted member 320 and enables the weighted member to be pivotally carried on the shank of a bolt 324 threaded into the upper end of dog 300. A spring 326, encircles the shank of bolt 324 and is compressed between the upper side of weight end 316 and the head of the bolt to spring bias the convex end 316 into a snug abutment against the concave end 314 of dog 300. This structure provides an adjustable control for the unidirectional clutch. When the weighted member 320 is positioned as shown in Figure 10, the tendency of dog 300 is to cant counterclockwise relative to the axis of shaft 44 placing the gripping jaws 304 and 306 into gripping engagement with the flange of wheel 56. If it is desirable that no feed action be imparted to the wheel 56 by oscillation of the clutch fitting 48, weighted member 320 can be pivoted 180° from the position shown in Figure 9. In such a position the tendency of dog 300 is to cant clockwise relative to the axis of shaft 44 and no gripping action between the two dog jaws 304 and 306 results because the slight friction of the upper dog jaw on the wheel flange will not counteract the action of weight 320 which opposes canting of the dog. Oscillatory movement of the fitting 48 will merely cause the upper jaw of dog 300 to slide along the flange 276 and no rotation is imparted to the wheel 56.

To permit continuous operation without replacing clutch dog 300 because of worn jaws, an upper jaw insert 330 of hardened steel with four gripping edges 332 is fastened to the front face of dog 300 by a screw 334. With such an insert, it only becomes necessary to loosen screw 334 and rotate the insert 330 90° to place a new gripping jaw 332 adjacent the outer cylindrical surface 280 of flange 276. Four gripping edges are shown in the preferred embodiment but any number within reason can be provided on the insert.

With reference now to Figures 1 and 11, reciprocation of the feed shaft 40 to the right will move the abutment cage 50 into engagement with the left hand side of the clutch fitting boss 290, forcing the fitting 48 to rotate clockwise about the axis of shaft 44 against the action of spring 54. As the stroke of shaft 40 is constant, a variation of the incremental rotation of fitting 48 is enabled through the adjustability of abutment cage 50. The cage 50 comprises two flanged knobs 334 and 336, the left hand knob 334 being in threaded engagement with threaded end 52 of feed shaft 40 while the right hand knob 336 has a free sliding fit on the shaft 40. A series of bolts 338 pass through holes 339 provided in the flange 340 of knob 334 and are screw threaded into the flange 341 of knob 336, thus permitting axial movement of knob 336 toward knob 334 and limiting axial movement of knob 336 away from knob 334. A compression spring 342 is disposed about the feed rod 40 between the two knobs 334 and 336 maintaining them in spaced apart relationship as determined by the bolts 338. Spring 342, together with the two knobs 334 and 336, provides a resilient adjustable abutment on the end of shaft 40 enabling variation in the point of engagement of the abutment cage 50 and fitting 48 during the stroke of feed shaft 40, to vary the magnitude of the incremental rotation of fitting 48. Adjustment of threaded knob 334 may be locked by a wing nut 344 threaded on the end of shaft 40 and abutting the threaded knob 334.

Operation

This mechanism accomplishes stoker feed in the following manner. Rotation of the conventional electric motor 32 connected to shaft 34 will rotate vane pump 22 at a substantially constant r.p.m., normally 1750 r.p.m. The vane pump 22 having its intake in fluid communication with the reservoir chamber 80 continuously delivers fluid under pressure through the outlet 136 into the left side of piston cylinder behind piston 100. Through automatic operation of the snap action valve assembly 200, which controls the accumulation and discharge of pressure fluid from behind piston 100 through ported passageway 220, the piston member 100 is caused to reciprocate under alternate forces of fluid pressure from the vane pump 22 and compressed spring force from the coil spring 112. This hydraulic speed reducer has a ratio of approximately 1500 to 1 which can be varied by shifting the pump casing 70 which changes the degree of eccentricity of impeller 160 relative to its pumping chamber 150, and hence varies the pumping capacity of the pump.

Reciprocation of piston rod 36, which is coupled to a feed rod 40, is transferred through the abutment cage 50 to unidirectional clutch fitting 48. Reciprocation of the feed shaft 40 will cause periodic incremental oscillation of the clutch fitting 48 about the axis of stoker sprocket shaft 44 which transmits incremental movement in one direction to the sprocket shaft 44 because of the unidirectional gripping action of the clutch dog 300 on the flange 276 of the worm feed shaft wheel 56. By varying the position of the adjustable abutment cage 50 on the end of feed shaft 40 the incremental rotation of fitting 48 and sprocket shaft 44 can be varied from 0° to approximately 35° to realize a further speed reduction over that accomplished in the hydraulic speed reducer 20.

During reciprocation of the hydraulic speed reducer piston 100 each stroke of the piston 100 under the compressive force of spring 112 creates a momentary vacuum within the cylinder chamber 96. Such a vacuum in turn will siphon any fluid leakage, through the tubing 192 from the pump impeller shaft oil seal reservoir 182 to the right hand portion of piston cylinder 96.

From the foregoing description it will be understood that this invention provides a simple, compact, rugged and dependable automatic low speed stoking mechanism incorporating a high ratio hydraulic speed reducer wherein operation can be continuous over long periods of time and wherein the mechanism within the speed reducer proper is substantially noiseless.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired by United States Letters Patent is:

1. A drive mechanism comprising: a fluid servomotor including a cylindrical housing and a reciprocable output member; a fluid reservoir on said housing; a partition wall between said housing and said reservoir, constituting one cylinder head for said cylindrical housing including servomotor exhaust passage means between the interior of said housing and said reservoir and a snap action flow control valve in said passage means; a rotary pump disposed exterior of said reservoir and housing, at least partially in and constituted in part by said partition wall; fluid communication means, including said passage means, connecting said servomotor, pump and reservoir; and said reciprocable output member being projected from within said housing directly through said partition wall and said reservoir to the exterior of said reservoir and having means connected to a portion of said output member disposed within said reservoir to engage and control action of said control valve.

2. A drive mechanism for use in combination with a stoking unit comprising: a hydraulic speed reducing unit having a pump; a fluid servomotor assembly; a fluid reservoir adjacent said servomotor assembly; means between said servomotor assembly and said fluid reservoir comprising a common partition wall dividing the interior of said servomotor assembly from the interior of said reservoir, a pump control means enabling periodic reversal of servo-motor movement responsive to servomotor movements, and means providing fluid communication between said reservoir, pump, pump control means and servomotor whereby operation of said pump causes movement of said servomotor with periodic servomotor reversal; means separate from said partition wall rigidly securing said servomotor assembly to said fluid reservoir and clamping said partition wall therebetween; and reciprocable means connected to and operable by said servomotor and projecting through said partition and said reservoir.

3. An integral hydraulic speed reducer comprising: a cylinder having end walls, a fluid reservoir fixed to one end of said cylinder, a piston reciprocable in said cylinder and having a coaxial element projecting through one end wall of said cylinder and through said reservoir, spring means in said cylinder coacting with and biasing said piston in one direction, a pump fixed to said cylinder exterior of said reservoir having intake means and discharge means, means providing fluid communication between said intake means and said reservoir and between said discharge means and the interior of said cylinder enabling pump discharge to act on said piston in opposition to said spring means, fluid communication means with a passage communicating between the interior of said cylinder at the opposite side of said piston from said spring means and said reservoir including valve means to open or close said passage and control communication between said pump discharge and said reservoir, a double acting snap action control assembly operably connected to said valve means, and means on said coaxial element to engage and operate said control assembly upon a range movement of said piston in either direction.

4. A speed reducer as defined in claim 3 wherein said pump discharge and said passage communicate with the interior of said cylinder at said one end, a pressure relief valve means is provided between said one end of the cylinder and said reservoir, and an equalizing fluid passage communicates between the other end of said cylinder and said reservoir.

5. A speed reducer as defined in claim 3 wherein a member having a cylindrical recess extends from said cylinder, and said pump comprises said recess, a cylindrical impeller with a diameter slightly less than said recess and having a slotted end disposed in said recess, a vane disposed in said slot with its ends closely adjacent the cylindrical wall of said recess, a pump housing having a bore rotatably receiving said impeller and adjustably mounted on said member extending from said cylinder to vary the eccentricity of said impeller relative to said recess, and means to rotate said impeller.

6. A speed reducer as defined in claim 5 wherein said means to rotate the impeller includes a shaft, a chambered seal bushing is mounted in said pump housing encircling said shaft and fluid communication means are provided between said chambered seal bushing and the upper portion of said other end of said cylinder.

7. A hydraulic speed reducer comprising a cylinder having a wall at one end, a plate having one side abutting and closing the other end of the cylinder, a housing having a peripheral wall and one end wall disposed against the opposite side of said plate in substantial alignment with said cylinder, a piston disposed in operative relation within said cylinder, a piston rod extending from one side of said piston and projecting through said plate and the housing end wall, resilient means compressed between the opposite side of said piston and said cylinder end wall, a flow passage in said plate communicating between the interiors of said cylinder and housing, a double acting snap action valve assembly disposed on said plate and controlling flow through said flow passage; an eccentrically adjustably mounted vane type pump disposed at least partially in said plate having intake means communicating with the inside lower portion of said housing and discharge means opening from said plate to the interior of said cylinder, and a flow equalizing passage between the lower portion of said housing and the lower portion of said cylinder adjacent the cylinder end wall, said housing providing a reservoir for operating fluid.

8. A double acting snap action control valve comprising: a support; a valve casing on said support with fluid passage means therethrough and a bore intersecting said passage means; a ported plug rotatably disposed in said bore to control flow through said fluid passage means; a pivotable member journalled on said support with its axis parallel to the plug axis; a link disposed on said support for combined pivotal movement about a pivot axis parallel to the plug axis and transverse movement relative to the pivot axis; a second link pivoted adjacent one end on said support coaxially with said plug axis and pivotally connected adjacent its other end to said first link means provided in the path of movement of said second link to engage with and provide limit positions for said second link; resilient means between said first link and said support biasing said first link toward said second link; and means connecting said second link to said plug whereby movement of said two links from either limit position to a position where all pivot axis of the two links are aligned does not rotate the plug and subsequent movement of the two links past their aligned positions to the other limit position will rotate the valve plug.

9. In a hydraulic speed reducing mechanism wherein an output member is movable backward and forward in a fixed path, a control valve assembly comprising: two spaced apart members, one of said members having fluid passage means therethrough and a bore intersecting said passage means, a rotatable ported plug disposed in said bore and adapted to open or close fluid communication through said passage means, a pivoted spring loaded double link assembly one link of which has a lost motion connection with said plug, the other link of which is pivotally and slidably journalled in the other of said members and both links of said double link assembly being pivotally connected intermediate said spaced apart members, to operate said plug with a snap action when the link assembly is moved to a position where said double links pivot beyond an aligned arrangement, and means fastened to said output member to engage said double link assembly intermediate said spaced apart members and move said double link assembly to a position where snap action valve movement occurs, operable for both directions of output member movement.

10. A hydraulic speed reducer comprising a servomotor; a pump; a fluid reservoir; a support means between said servomotor and said reservoir; a double acting snap action control valve comprising a valve casing on said support means with fluid passage means through the valve casing and support means providing fluid communication between said servomotor and said reservoir and a bore intersecting said passage means, a ported plug rotatably disposed in said bore to control flow through said member, a pivotable member journalled on said support with its axis parallel to the plug axis, a link disposed on said support means for combined pivotal movement about a pivot axis parallel to the plug axis and transverse movement relative to the pivot axis, a second link pivoted adjacent one end on said support coaxially with said plug axis and pivotally connected adjacent its other end to said first link, means to coact with and provide limit positions for said second link, resilient means between said first link and said support biasing said first link toward said second link, and means connecting said second link to said plug whereby movement of said two links from either a limit position to a position where all pivot axes of the two links are aligned does not rotate the plug and subsequent movement of the two links past their aligned position to the other limit position will rotate the valve plug; fluid communication means, including said fluid passage means, connecting said servomotor, pump and reservoir; and means actuated by said servomotor to periodically engage and shift said control valve links from one limit position to the other limit position to enable periodic reversal of said servomotor.

11. A hydraulic speed reducer comprising a servomotor including an output member movable backward and forward in a fixed path; a pump; a fluid reservoir; a control valve assembly disposed between said servomotor and reservoir comprising a member having fluid passage means therethrough providing fluid communication between said servomotor and said reservoir and a bore intersecting said passage means, a rotatable ported plug disposed in said bore and movable to open or close fluid communication through said passage means, a pivoted spring loaded double link assembly having a lost motion connection with said plug to operate said plug with a snap action when the link assembly is moved to a position where the assembly pivots pass beyond an aligned arrangement; means fastened to said output member to engage and move said double link assembly to a position where snap action valve movement occurs, operable for both directions of output member movement; and fluid communication means, including said fluid passage means, operatively connecting said servomotor, pump and reservoir.

References Cited in the file of this patent

UNITED STATES PATENTS

| | | |
|---|---|---|
| 380,692 | Pond et al. | Apr. 10, 1888 |
| 589,700 | Cowles | Sept. 7, 1897 |
| 1,087,952 | Kenney et al. | Feb. 24, 1914 |
| 1,684,689 | Snyder | Sept. 18, 1928 |
| 1,691,673 | Rohe et al. | Nov. 13, 1928 |
| 1,815,399 | Curnutt | July 21, 1931 |
| 1,939,887 | Ferris et al. | Dec. 19, 1933 |
| 2,131,910 | Vernon et al. | Oct. 4, 1938 |
| 2,142,815 | Getz | Jan. 3, 1939 |
| 2,399,294 | Ray | Apr. 30, 1946 |
| 2,515,032 | Cipriano | July 11, 1950 |
| 2,626,504 | Frisone | Jan. 27, 1953 |
| 2,640,426 | McLeod | June 2, 1953 |
| 2,797,795 | West | July 2, 1957 |
| 2,824,426 | Rowe et al. | Feb. 25, 1958 |

UNITED STATES PATENT OFFICE
CERTIFICATE OF CORRECTION

Patent No. 2,932,166                      April 12, 1960

George E. Valentine et al.

It is hereby certified that error appears in the printed specification of the above numbered patent requiring correction and that the said Letters Patent should read as corrected below.

Column 8, line 51, after "unidirectional" insert -- movement of the wheel 56 --.

Signed and sealed this 4th day of October 1960.

(SEAL)
Attest:
KARL H. AXLINE
Attesting Officer

ROBERT C. WATSON
Commissioner of Patents